(12) United States Patent
Okishima

(10) Patent No.: US 7,312,587 B2
(45) Date of Patent: Dec. 25, 2007

(54) CONTROL DEVICE FOR HIGH INTENSITY DISCHARGE BULB AND METHOD OF CONTROLLING HIGH INTENSITY DISCHARGE BULB

(75) Inventor: Kiyoshi Okishima, Kanagawa (JP)

(73) Assignee: Sanyo Tecnica Co., Ltd., Kanagawa (JP)

( * ) Notice: Subject to any disclaimer, the term of this patent is extended or adjusted under 35 U.S.C. 154(b) by 0 days.

(21) Appl. No.: 11/372,893

(22) Filed: Mar. 10, 2006

(65) Prior Publication Data

US 2006/0208664 A1 Sep. 21, 2006

(30) Foreign Application Priority Data

Mar. 15, 2005 (JP) ............................. 2005-073162

(51) Int. Cl.
*G05F 1/00* (2006.01)
(52) U.S. Cl. .................. 315/291; 315/307; 315/247; 315/274; 315/279
(58) Field of Classification Search ............... 315/291, 315/307, 247, 246, 224, 225, 274, 276, 277, 315/279, 297, 209 R
See application file for complete search history.

(56) References Cited

U.S. PATENT DOCUMENTS

| 5,481,163 A | * | 1/1996 | Nakamura et al. | 315/308 |
| 6,163,115 A | * | 12/2000 | Ishizuka | 315/308 |
| 2004/0183476 A1 | * | 9/2004 | Ishizuka | 315/291 |
| 2004/0189217 A1 | * | 9/2004 | Ishihara et al. | 315/291 |
| 2006/0055341 A1 | * | 3/2006 | Watanabe et al. | 315/291 |

OTHER PUBLICATIONS

Tsutomu Shiomi, Takashi Kambara, et al., Ballasts for HID Headlamp Systems for Automobiles, Matsushita Electric Works Technical Report (May 2001), pp. 13-19.

* cited by examiner

*Primary Examiner*—Tuyet Vo
(74) *Attorney, Agent, or Firm*—Kenneth J. LuKacher

(57) ABSTRACT

Two types of rectangular waves having different numbers of driving pulses are applied to the HID bulb. By changing the combination of these two different types of rectangular waves to be supplied, the driving energy of the HID bulb is increased or decreased, thereby supply electric energy to the HID bulb is controlled accurately.

5 Claims, 15 Drawing Sheets

Fig.2
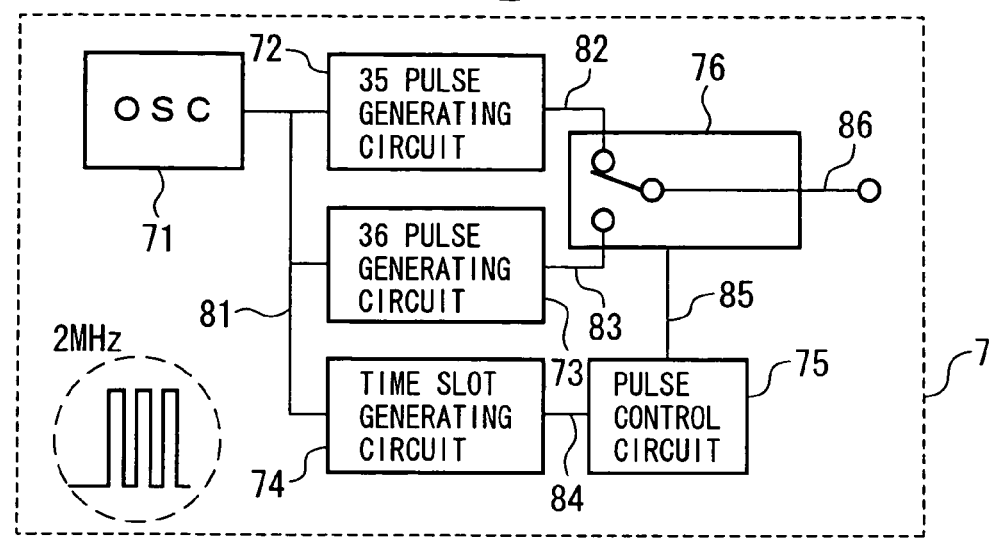
(a) 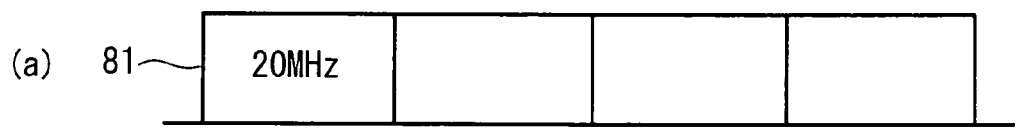
(b) 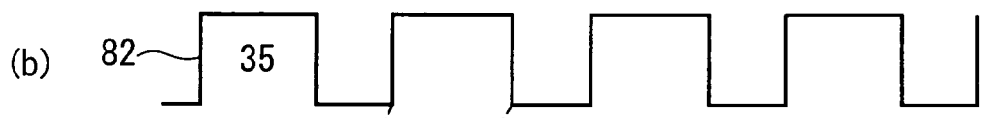
(c) 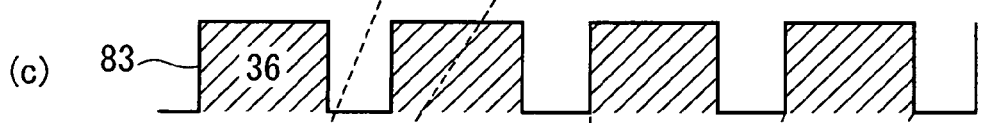
(d) 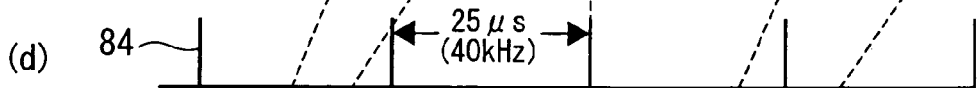
(e) 
(f) 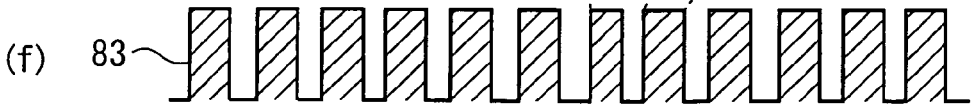
(g) 
(h) 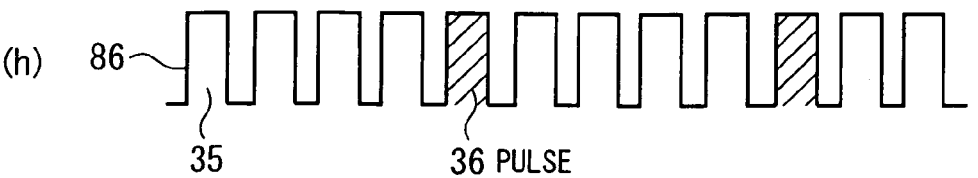

Fig.8

| A | B | C | D | E | F | G | H | I | J | K | L | M | N | O |
|---|---|---|---|---|---|---|---|---|---|---|---|---|---|---|
| 1 | | | | | | | | | | | | | | |
| 2 | | | BASIC PROCESS | | | | | CORRECTION PROCESS BY 140 PULSE DRIVING | | | | | | |
| 3 | | | INITIAL MEASUREMENT/SETTING FACTOR | | BASIC SETTING ELECTRIC POWER | | | | CALCULATION OF NUMBER OF CORRECTION PULSES | | | ELECTRIC POWER AFTER CORRECTION | | |
| 4 | (W) | BULB VOLTAGE (Vi) (V) | REQUIRED CURRENT (A) | ASSUMED CURRENT (i) (A) | SETTING VALUE (W) | ERROR \|ΔWi\| (W) | Δ% % | ΔW/(NUMBER OF PULSES) Δ/0.250 | α | BASIC PULSE NUMBER | TOTAL | ELECTRIC POWER (W) (W) | RESIDUAL ERROR(ΔW) (W) | \|ΔWi\| % |
| 5 | 35 | 73.50 | 0.476190 | 0.466667 | 34.300000 | 0.700000 | 2.00% | 2.800000 | 3 | 140 | 143 | 35.050000 | 0.050000 | 0.14% |
| 6 | 35 | 74.00 | 0.472973 | 0.466667 | 34.533333 | 0.466667 | 1.33% | 1.866667 | 2 | 140 | 142 | 35.033333 | 0.033333 | 0.10% |
| 7 | 35 | 74.50 | 0.469799 | 0.466667 | 34.766667 | 0.233333 | 0.67% | 0.933333 | 1 | 140 | 141 | 35.016667 | 0.016667 | 0.05% |
| 8 | 35 | 75.00 | 0.466667 | 0.466667 | 35.000000 | 0.000000 | 0.00% | 0.000000 | 0 | 140 | 140 | 35.000000 | 0.000000 | 0.00% |
| 9 | 35 | 75.50 | 0.463576 | 0.466667 | 35.233333 | 0.233333 | 0.67% | -0.933333 | -1 | 140 | 139 | 34.983333 | 0.016667 | 0.05% |
| 10 | 35 | 76.00 | 0.460526 | 0.466667 | 35.466667 | 0.466667 | 1.33% | -1.866667 | -2 | 140 | 138 | 34.966667 | 0.033333 | 0.10% |
| 11 | 35 | 76.50 | 0.457516 | 0.466667 | 35.700000 | 0.700000 | 2.00% | -2.800000 | -3 | 140 | 137 | 34.950000 | 0.050000 | 0.14% |
| 12 | 35 | 83.50 | 0.419162 | 0.411765 | 34.382353 | 0.617647 | 1.76% | 2.470588 | 2 | 140 | 142 | 34.882353 | 0.117647 | 0.34% |
| 13 | 35 | 84.00 | 0.416667 | 0.411765 | 34.588235 | 0.411765 | 1.18% | 1.647059 | 2 | 140 | 142 | 35.088235 | 0.088235 | 0.25% |
| 14 | 35 | 84.50 | 0.414201 | 0.411765 | 34.794118 | 0.205882 | 0.59% | 0.823529 | 1 | 140 | 141 | 35.044118 | 0.044118 | 0.13% |
| 15 | 35 | 85.00 | 0.411765 | 0.411765 | 35.000000 | 0.000000 | 0.00% | 0.000000 | 0 | 140 | 140 | 35.000000 | 0.000000 | 0.00% |
| 16 | 35 | 85.50 | 0.409357 | 0.411765 | 35.205882 | 0.205882 | 0.59% | -0.823529 | -1 | 140 | 139 | 34.955882 | 0.044118 | 0.13% |
| 17 | 35 | 86.00 | 0.406977 | 0.411765 | 35.411765 | 0.411765 | 1.18% | -1.647059 | -2 | 140 | 138 | 34.911765 | 0.088235 | 0.25% |
| 18 | 35 | 86.50 | 0.404624 | 0.411765 | 35.617647 | 0.617647 | 1.76% | -2.470588 | -2 | 140 | 138 | 35.117647 | 0.117647 | 0.34% |
| 19 | 35 | 93.50 | 0.374332 | 0.368421 | 34.447368 | 0.552632 | 1.58% | 2.210528 | 2 | 140 | 142 | 34.947368 | 0.052632 | 0.15% |
| 20 | 35 | 94.00 | 0.372340 | 0.368421 | 34.631579 | 0.368421 | 1.05% | 1.473684 | 1 | 140 | 141 | 34.881579 | 0.118421 | 0.34% |
| 21 | 35 | 94.50 | 0.370370 | 0.368421 | 34.815789 | 0.184211 | 0.53% | 0.736842 | 1 | 140 | 141 | 35.365789 | 0.065789 | 0.19% |
| 22 | 35 | 95.00 | 0.368421 | 0.368421 | 35.000000 | 0.000000 | 0.00% | 0.000000 | 0 | 140 | 140 | 35.000000 | 0.000000 | 0.00% |
| 23 | 35 | 95.50 | 0.366492 | 0.368421 | 35.184211 | 0.184211 | 0.53% | -0.736842 | -1 | 140 | 139 | 34.934211 | 0.065789 | 0.19% |
| 24 | 35 | 96.00 | 0.364583 | 0.368421 | 35.368421 | 0.368421 | 1.05% | -1.473684 | -2 | 140 | 139 | 35.118421 | 0.118421 | 0.34% |
| 25 | 35 | 96.50 | 0.362694 | 0.368421 | 35.552632 | 0.552632 | 1.58% | -2.210526 | -2 | 140 | 138 | 35.052632 | 0.052632 | 0.15% |
| 26 | | | AVERAGE→ | | 35.000000 | 0.356244 | | | | | AVERAGE→ | 35.000000 | 0.055890 | |
| 27 | | | STANDARD DEVIATION→ | | | 0.217818 | | | | | STANDARD DEVIATION→ | | 0.038773 | |

Fig.9

| | A | B | C | D | E | F | G | H | I | J | K | L | M | N | O |
|---|---|---|---|---|---|---|---|---|---|---|---|---|---|---|---|
| 1 | | | | | | | | | CORRECTION PROCESS BY 35 PULSE DRIVING | | | | | | |
| 2 | | | BASIC PROCESS | | | | | | | | | | | | |
| 3 | | | INITIAL MEASUREMENT/SETTING FACTOR | | | BASIC SETTING ELECTRIC POWER | | | CALCULATION OF NUMBER OF CORRECTION PULSES | | | | ELECTRIC POWER AFTER CORRECTION | | |
| 4 | | | BULB VOLTAGE (Vi) | REQUIRED CURRENT | ASSUMED CURRENT (i) | SETTING VALUE | ERROR \|ΔW\| | Δ% | ΔW/(NUMBER OF PULSES) | α | BASIC PULSE NUMBER | TOTAL | ELECTRIC POWER (W) | RESIDUAL ERROR (ΔW) | \|ΔW\| |
| | (W) | (W) | (V) | (A) | (A) | (W) | (W) | % | Δ/1.000 | | | | (W) | (W) | % |
| 5 | 35 | 35 | 73.50 | 0.476190 | 0.466667 | 34.300000 | 0.700000 | 2.00% | 0.700000 | 1 | 35 | 36 | 35.300000 | 0.300000 | 0.86% |
| 6 | 35 | 35 | 74.00 | 0.472973 | 0.466667 | 34.533333 | 0.466667 | 1.33% | 0.466667 | 0 | 35 | 35 | 34.533333 | 0.466667 | 1.33% |
| 7 | 35 | 35 | 74.50 | 0.469799 | 0.466667 | 34.766667 | 0.233333 | 0.67% | 0.233333 | 0 | 35 | 35 | 34.766667 | 0.233333 | 0.67% |
| 8 | 35 | 35 | 75.00 | 0.466667 | 0.466667 | 35.000000 | 0.000000 | 0.00% | 0.000000 | 0 | 35 | 35 | 35.000000 | 0.000000 | 0.00% |
| 9 | 35 | 35 | 75.50 | 0.463576 | 0.466667 | 35.233333 | 0.233333 | 0.67% | -0.233333 | 0 | 35 | 35 | 35.233333 | 0.233333 | 0.67% |
| 10 | 35 | 35 | 76.00 | 0.460526 | 0.466667 | 35.466667 | 0.466667 | 1.33% | -0.466667 | 0 | 35 | 35 | 35.466667 | 0.466667 | 1.33% |
| 11 | 35 | 35 | 76.50 | 0.457516 | 0.466667 | 35.700000 | 0.700000 | 2.00% | -0.700000 | -1 | 35 | 34 | 34.700000 | 0.300000 | 0.86% |
| 12 | 35 | 35 | 83.50 | 0.419162 | 0.411765 | 34.382353 | 0.617647 | 1.76% | 0.617647 | 1 | 35 | 36 | 35.382353 | 0.382353 | 1.09% |
| 13 | 35 | 35 | 84.00 | 0.416667 | 0.411765 | 34.588235 | 0.411765 | 1.18% | 0.411765 | 0 | 35 | 35 | 34.588235 | 0.411765 | 1.18% |
| 14 | 35 | 35 | 84.50 | 0.414201 | 0.411765 | 34.794118 | 0.205882 | 0.59% | 0.205882 | 0 | 35 | 35 | 34.794118 | 0.205882 | 0.59% |
| 15 | 35 | 35 | 85.00 | 0.411765 | 0.411765 | 35.000000 | 0.000000 | 0.00% | 0.000000 | 0 | 35 | 35 | 35.000000 | 0.000000 | 0.00% |
| 16 | 35 | 35 | 85.50 | 0.409357 | 0.411765 | 35.205882 | 0.205882 | 0.59% | -0.205882 | 0 | 35 | 35 | 35.205882 | 0.205882 | 0.59% |
| 17 | 35 | 35 | 86.00 | 0.406977 | 0.411765 | 35.411765 | 0.411765 | 1.18% | -0.411765 | 0 | 35 | 35 | 35.411765 | 0.411765 | 1.18% |
| 18 | 35 | 35 | 86.50 | 0.404624 | 0.411765 | 35.617647 | 0.617647 | 1.76% | -0.617647 | -1 | 35 | 34 | 34.617647 | 0.382353 | 1.09% |
| 19 | 35 | 35 | 93.50 | 0.374332 | 0.368421 | 34.447368 | 0.552632 | 1.58% | 0.552632 | 1 | 35 | 36 | 35.447368 | 0.447368 | 1.28% |
| 20 | 35 | 35 | 94.00 | 0.372340 | 0.368421 | 34.631579 | 0.368421 | 1.05% | 0.368421 | 0 | 35 | 35 | 34.631579 | 0.368421 | 1.05% |
| 21 | 35 | 35 | 94.50 | 0.370370 | 0.368421 | 34.815789 | 0.184211 | 0.53% | 0.184211 | 0 | 35 | 35 | 34.815789 | 0.184211 | 0.53% |
| 22 | 35 | 35 | 95.00 | 0.368421 | 0.368421 | 35.000000 | 0.000000 | 0.00% | 0.000000 | 0 | 35 | 35 | 35.000000 | 0.000000 | 0.00% |
| 23 | 35 | 35 | 95.50 | 0.366492 | 0.368421 | 35.184211 | 0.184211 | 0.53% | -0.184211 | 0 | 35 | 35 | 35.184211 | 0.184211 | 0.53% |
| 24 | 35 | 35 | 96.00 | 0.364583 | 0.368421 | 35.368421 | 0.368421 | 1.05% | -0.368421 | 0 | 35 | 35 | 35.368421 | 0.368421 | 1.05% |
| 25 | 35 | 35 | 96.50 | 0.362694 | 0.368421 | 35.552632 | 0.552632 | 1.58% | -0.552632 | -1 | 35 | 34 | 34.552632 | 0.447368 | 1.28% |
| 26 | | | | | | 35.000000 | 0.356244 | | | | | AVERAGE→ | 35.000000 | 0.285714 | |
| 27 | | | | | | | 0.217818 | | | | | STANDARD DEVIATION→ | | 0.148970 | |

Fig.10

| | A | B | C | D | E | F | G | H | I | J | K | L | M | N | O | P | Q | R | S |
|---|---|---|---|---|---|---|---|---|---|---|---|---|---|---|---|---|---|---|---|
| 1 | | | BASIC PROCESS | | | | | | CORRECTION PROCESS BY 35 PULSE DRIVING | | | | | | | CORRECTION PROCESS BY FIG.7 | | | |
| 2 | | | INITIAL MEASUREMENT/SETTING FACTOR | | | BASIC SETTING ELECTRIC POWER | | | CALCULATION OF NUMBER OF CORRECTION PULSES | | | | ELECTRIC POWER AFTER CORRECTION | | | CALCULATION OF NUMBER OF CORRECTION PULSES | ELECTRIC POWER AFTER CORRECTION | | |
| 3 | | | BULB VOLTAGE (Vi) | REQUIRED CURRENT | ASSUMED CURRENT (i) | SETTING VALUE | ERROR \|ΔW\| | Δ% | ΔW/(NUMBER PULSES) /1.000 | α | BASIC PULSE NUMBER | TOTAL | ELECTRIC POWER(W) | RESIDUAL ERROR(ΔW) | \|ΔW\| % | | ELECTRIC POWER(W) | RESIDUAL ERROR(ΔW) | \|ΔW\| % |
| 4 | (W) | | (V) | (A) | (A) | (W) | (W) | % | ΔW | | | | (W) | (W) | % | | (W) | (W) | % |
| 5 | 35 | | 73.50 | 0.476190 | 0.466667 | 34.300000 | 0.700000 | 2.00% | 0.700000 | 1 | 35 | 36 | 35.300000 | 0.300000 | 0.86% | 0.700000 | 35.000000 | 0.000000 | 0.00% |
| 6 | 35 | | 74.00 | 0.472973 | 0.466667 | 34.533333 | 0.466667 | 1.33% | 0.466667 | 0 | 35 | 35 | 34.533333 | 0.466667 | 1.33% | 0.444444 | 34.977777 | 0.022223 | 0.06% |
| 7 | 35 | | 74.50 | 0.469799 | 0.466667 | 34.766667 | 0.233333 | 0.67% | 0.233333 | 0 | 35 | 35 | 34.766667 | 0.233333 | 0.67% | 0.222222 | 34.888889 | 0.011111 | 0.03% |
| 8 | 35 | | 75.00 | 0.466667 | 0.466667 | 35.000000 | 0.000000 | 0.00% | 0.000000 | 0 | 35 | 35 | 35.000000 | 0.000000 | 0.00% | 0.000000 | 35.000000 | 0.000000 | 0.00% |
| 9 | 35 | | 75.50 | 0.463576 | 0.466667 | 35.233333 | 0.233333 | 0.67% | -0.233333 | 0 | 35 | 35 | 35.233333 | 0.233333 | 0.67% | -0.222222 | 35.011111 | 0.011111 | 0.03% |
| 10 | 35 | | 76.00 | 0.460526 | 0.466667 | 35.466667 | 0.466667 | 1.33% | -0.466667 | 0 | 35 | 35 | 35.466667 | 0.466667 | 1.33% | -0.444444 | 35.022223 | 0.022223 | 0.06% |
| 11 | 35 | | 76.50 | 0.457516 | 0.466667 | 35.700000 | 0.700000 | 2.00% | -0.700000 | -1 | 35 | 34 | 34.700000 | 0.300000 | 0.86% | -0.700000 | 35.000000 | 0.000000 | 0.00% |
| 12 | 35 | | 83.50 | 0.419162 | 0.411765 | 34.382353 | 0.617647 | 1.76% | 0.617647 | 1 | 35 | 36 | 35.382353 | 0.382353 | 1.09% | 0.625000 | 35.007353 | 0.007353 | 0.02% |
| 13 | 35 | | 84.00 | 0.416667 | 0.411765 | 34.588235 | 0.411765 | 1.18% | 0.411765 | 0 | 35 | 35 | 34.588235 | 0.411765 | 1.18% | 0.400000 | 35.988235 | 0.011765 | 0.03% |
| 14 | 35 | | 84.50 | 0.414201 | 0.411765 | 34.794118 | 0.205882 | 0.59% | 0.205882 | 0 | 35 | 35 | 34.794118 | 0.205882 | 0.59% | 0.200000 | 34.994118 | 0.005882 | 0.02% |
| 15 | 35 | | 85.00 | 0.411765 | 0.411765 | 35.000000 | 0.000000 | 0.00% | 0.000000 | 0 | 35 | 35 | 35.000000 | 0.000000 | 0.00% | 0.000000 | 35.000000 | 0.000000 | 0.00% |
| 16 | 35 | | 85.50 | 0.409357 | 0.411765 | 35.205882 | 0.205882 | 0.59% | -0.205882 | 0 | 35 | 35 | 35.205882 | 0.205882 | 0.59% | -0.200000 | 35.005882 | 0.005882 | 0.02% |
| 17 | 35 | | 86.00 | 0.406977 | 0.411765 | 35.411765 | 0.411765 | 1.18% | -0.411765 | 0 | 35 | 35 | 35.411765 | 0.411765 | 1.18% | -0.400000 | 35.011765 | 0.011765 | 0.03% |
| 18 | 35 | | 86.50 | 0.404624 | 0.411765 | 35.617647 | 0.617647 | 1.76% | -0.617647 | -1 | 35 | 34 | 34.617647 | 0.382353 | 1.09% | -0.625000 | 34.992647 | 0.007353 | 0.02% |
| 19 | 35 | | 93.50 | 0.374332 | 0.368421 | 34.447368 | 0.552632 | 1.58% | 0.552632 | 1 | 35 | 36 | 35.447368 | 0.447368 | 1.28% | 0.555556 | 35.002924 | 0.002924 | 0.01% |
| 20 | 35 | | 94.00 | 0.372340 | 0.368421 | 34.631579 | 0.368421 | 1.05% | 0.368421 | 0 | 35 | 35 | 34.631579 | 0.368421 | 1.05% | 0.375000 | 35.006579 | 0.006579 | 0.02% |
| 21 | 35 | | 94.50 | 0.370370 | 0.368421 | 34.815789 | 0.184211 | 0.53% | 0.184211 | 0 | 35 | 35 | 34.815789 | 0.184211 | 0.53% | 0.180000 | 34.995789 | 0.004211 | 0.01% |
| 22 | 35 | | 95.00 | 0.368421 | 0.368421 | 35.000000 | 0.000000 | 0.00% | 0.000000 | 0 | 35 | 35 | 35.000000 | 0.000000 | 0.00% | 0.000000 | 35.000000 | 0.000000 | 0.00% |
| 23 | 35 | | 95.50 | 0.366492 | 0.368421 | 35.184211 | 0.184211 | 0.53% | -0.184211 | 0 | 35 | 35 | 35.184211 | 0.184211 | 0.53% | -0.180000 | 35.004211 | 0.004211 | 0.01% |
| 24 | 35 | | 96.00 | 0.364583 | 0.368421 | 35.368421 | 0.368421 | 1.05% | -0.368421 | 0 | 35 | 35 | 35.368421 | 0.368421 | 1.05% | -0.375000 | 34.993421 | 0.006579 | 0.02% |
| 25 | 35 | | 96.50 | 0.362694 | 0.368421 | 35.552632 | 0.552632 | 1.58% | -0.552632 | -1 | 35 | 34 | 34.552632 | 0.447368 | 1.28% | -0.555556 | 34.997076 | 0.002924 | 0.01% |
| 26 | | | AVERAGE→ | | | 35.000000 | 0.356244 | | | | AVERAGE→ | | 35.000000 | 0.285714 | | AVERAGE→ | 35.000000 | 0.006662 | |
| 27 | | | STANDARD DEVIATION→ | | | | 0.217818 | | | | STANDARD DEVIATION→ | | | 0.148970 | | STANDARD DEVIATION→ | | 0.006321 | |

| PULSE A | | | PULSE B | | | TOTAL NUMBER OF PULSES (A+B) | NUMBER OF PULSES PER TIME SLOT |
|---|---|---|---|---|---|---|---|
| NUMBER OF PULSES | NUMBER OF TIMES | TOTAL NUMBER OF PULSES | NUMBER OF PULSES | NUMBER OF TIMES | TOTAL NUMBER OF PULSES | | |
| 35 | × 6 | 210 | 36 | × 0 | 0 | 210 | 35.000000 |
| 35 | × 5 | 175 | 36 | × 1 | 36 | 211 | 35.166667 |
| 35 | × 4 | 140 | 36 | × 2 | 72 | 212 | 35.333333 |
| 35 | × 3 | 105 | 36 | × 3 | 108 | 213 | 35.500000 |
| 35 | × 2 | 70 | 36 | × 4 | 144 | 214 | 35.666667 |
| 35 | × 1 | 35 | 36 | × 5 | 180 | 215 | 35.833333 |
| 35 | × 0 | 0 | 36 | × 6 | 216 | 216 | 36.000000 |

(B)

| PULSE A | | | PULSE B | | | TOTAL NUMBER OF PULSES (A+B) | NUMBER OF PULSES PER TIME SLOT |
|---|---|---|---|---|---|---|---|
| NUMBER OF PULSES | NUMBER OF TIMES | TOTAL NUMBER OF PULSES | NUMBER OF PULSES | NUMBER OF TIMES | TOTAL NUMBER OF PULSES | | |
| 35 | × 7 | 245 | 36 | × 0 | 0 | 245 | 35.000000 |
| 35 | × 6 | 210 | 36 | × 1 | 36 | 246 | 35.142857 |
| 35 | × 5 | 175 | 36 | × 2 | 72 | 247 | 35.285714 |
| 35 | × 4 | 140 | 36 | × 3 | 108 | 248 | 35.428571 |
| 35 | × 3 | 105 | 36 | × 4 | 144 | 249 | 35.571429 |
| 35 | × 2 | 70 | 36 | × 5 | 180 | 250 | 35.714286 |
| 35 | × 1 | 35 | 36 | × 6 | 216 | 251 | 35.857143 |
| 35 | × 0 | 0 | 36 | × 7 | 252 | 252 | 36.000000 |

(C)

| PULSE A | | | PULSE B | | | TOTAL NUMBER OF PULSES (A+B) | NUMBER OF PULSES PER TIME SLOT |
|---|---|---|---|---|---|---|---|
| NUMBER OF PULSES | NUMBER OF TIMES | TOTAL NUMBER OF PULSES | NUMBER OF PULSES | NUMBER OF TIMES | TOTAL NUMBER OF PULSES | | |
| 35 | × 8 | 280 | 36 | × 0 | 0 | 280 | 35.000000 |
| 35 | × 7 | 245 | 36 | × 1 | 36 | 281 | 35.125000 |
| 35 | × 6 | 210 | 36 | × 2 | 72 | 282 | 35.250000 |
| 35 | × 5 | 175 | 36 | × 3 | 108 | 283 | 35.375000 |
| 35 | × 4 | 140 | 36 | × 4 | 144 | 284 | 35.500000 |
| 35 | × 3 | 105 | 36 | × 5 | 180 | 285 | 35.625000 |
| 35 | × 2 | 70 | 36 | × 6 | 216 | 286 | 35.750000 |
| 35 | × 1 | 35 | 36 | × 7 | 252 | 287 | 35.875000 |
| 35 | × 0 | 0 | 36 | × 8 | 288 | 288 | 36.000000 |

(D)

| PULSE A | | | PULSE B | | | TOTAL NUMBER OF PULSES (A+B) | NUMBER OF PULSES PER TIME SLOT |
|---|---|---|---|---|---|---|---|
| NUMBER OF PULSES | NUMBER OF TIMES | TOTAL NUMBER OF PULSES | NUMBER OF PULSES | NUMBER OF TIMES | TOTAL NUMBER OF PULSES | | |
| 35 | × 9 | 315 | 36 | × 0 | 0 | 315 | 35.000000 |
| 35 | × 8 | 280 | 36 | × 1 | 36 | 316 | 35.111111 |
| 35 | × 7 | 245 | 36 | × 2 | 72 | 317 | 35.222222 |
| 35 | × 6 | 210 | 36 | × 3 | 108 | 318 | 35.333333 |
| 35 | × 5 | 175 | 36 | × 4 | 144 | 319 | 35.444444 |
| 35 | × 4 | 140 | 36 | × 5 | 180 | 320 | 35.555556 |
| 35 | × 3 | 105 | 36 | × 6 | 216 | 321 | 35.666667 |
| 35 | × 2 | 70 | 36 | × 7 | 252 | 322 | 35.777778 |
| 35 | × 1 | 35 | 36 | × 8 | 288 | 323 | 35.888889 |
| 35 | × 0 | 0 | 36 | × 9 | 324 | 324 | 36.000000 |

(E)

| PULSE A | | | PULSE B | | | TOTAL NUMBER OF PULSES (A+B) | NUMBER OF PULSES PER TIME SLOT |
|---|---|---|---|---|---|---|---|
| NUMBER OF PULSES | NUMBER OF TIMES | TOTAL NUMBER OF PULSES | NUMBER OF PULSES | NUMBER OF TIMES | TOTAL NUMBER OF PULSES | | |
| 35 | × 10 | 350 | 36 | × 0 | 0 | 350 | 35.000000 |
| 35 | × 9 | 315 | 36 | × 1 | 36 | 351 | 35.100000 |
| 35 | × 8 | 280 | 36 | × 2 | 72 | 352 | 35.200000 |
| 35 | × 7 | 245 | 36 | × 3 | 108 | 353 | 35.300000 |
| 35 | × 6 | 210 | 36 | × 4 | 144 | 354 | 35.400000 |
| 35 | × 5 | 175 | 36 | × 5 | 180 | 355 | 35.500000 |
| 35 | × 4 | 140 | 36 | × 6 | 216 | 356 | 35.600000 |
| 35 | × 3 | 105 | 36 | × 7 | 252 | 357 | 35.700000 |
| 35 | × 2 | 70 | 36 | × 8 | 288 | 358 | 35.800000 |
| 35 | × 1 | 35 | 36 | × 9 | 324 | 359 | 35.900000 |
| 35 | × 0 | 0 | 36 | × 10 | 360 | 360 | 36.000000 |

Fig.15

| PULSE A | | | PULSE B | | | TOTAL NUMBER OF PULSES (A+B) | NUMBER OF PULSES PER TIME SLOT |
|---|---|---|---|---|---|---|---|
| NUMBER OF PULSES | NUMBER OF TIMES | TOTAL NUMBER OF PULSES | NUMBER OF PULSES | NUMBER OF TIMES | TOTAL NUMBER OF PULSES | | |
| 35 | × 6 | 210 | 36 | × 0 | 0 | 210 | 35.000000 |
| 35 | × 7 | 245 | 36 | × 0 | 0 | 245 | 35.000000 |
| 35 | × 8 | 280 | 36 | × 0 | 0 | 280 | 35.000000 |
| 35 | × 9 | 315 | 36 | × 0 | 0 | 315 | 35.000000 |
| 35 | × 10 | 350 | 36 | × 0 | 0 | 350 | 35.000000 |
| 35 | × 9 | 315 | 36 | × 1 | 36 | 351 | 35.100000 |
| 35 | × 8 | 280 | 36 | × 1 | 36 | 316 | 35.111111 |
| 35 | × 7 | 245 | 36 | × 1 | 36 | 281 | 35.125000 |
| 35 | × 6 | 210 | 36 | × 1 | 36 | 246 | 35.142857 |
| 35 | × 5 | 175 | 36 | × 1 | 36 | 211 | 35.166667 |
| 35 | × 8 | 280 | 36 | × 2 | 72 | 352 | 35.200000 |
| 35 | × 7 | 245 | 36 | × 2 | 72 | 317 | 35.222222 |
| 35 | × 6 | 210 | 36 | × 2 | 72 | 282 | 35.250000 |
| 35 | × 5 | 175 | 36 | × 2 | 72 | 247 | 35.287514 |
| 35 | × 7 | 245 | 36 | × 3 | 108 | 353 | 35.300000 |
| 35 | × 4 | 140 | 36 | × 2 | 72 | 212 | 35.333333 |
| 35 | × 6 | 210 | 36 | × 3 | 108 | 318 | 35.333333 |
| 35 | × 5 | 175 | 36 | × 3 | 108 | 283 | 35.375000 |
| 35 | × 6 | 210 | 36 | × 4 | 144 | 354 | 35.400000 |
| 35 | × 4 | 140 | 36 | × 3 | 108 | 248 | 35.428571 |
| 35 | × 5 | 175 | 36 | × 4 | 144 | 319 | 35.444444 |
| 35 | × 3 | 105 | 36 | × 3 | 108 | 213 | 35.500000 |
| 35 | × 4 | 140 | 36 | × 4 | 144 | 284 | 35.500000 |
| 35 | × 5 | 175 | 36 | × 5 | 180 | 355 | 35.500000 |
| 35 | × 4 | 140 | 36 | × 5 | 180 | 320 | 35.555555 |
| 35 | × 3 | 105 | 36 | × 4 | 144 | 249 | 35.571429 |
| 35 | × 4 | 140 | 36 | × 6 | 216 | 356 | 35.600000 |
| 35 | × 3 | 105 | 36 | × 5 | 180 | 285 | 35.625000 |
| 35 | × 2 | 70 | 36 | × 4 | 144 | 214 | 35.666667 |
| 35 | × 3 | 105 | 36 | × 6 | 216 | 321 | 35.666667 |
| 35 | × 3 | 105 | 36 | × 7 | 252 | 357 | 35.700000 |
| 35 | × 2 | 70 | 36 | × 5 | 180 | 250 | 35.714286 |
| 35 | × 2 | 70 | 36 | × 6 | 216 | 286 | 35.750000 |
| 35 | × 2 | 70 | 36 | × 7 | 252 | 322 | 35.777778 |
| 35 | × 2 | 70 | 36 | × 8 | 288 | 358 | 35.800000 |
| 35 | × 1 | 35 | 36 | × 5 | 180 | 215 | 35.833333 |
| 35 | × 1 | 35 | 36 | × 6 | 216 | 251 | 35.857143 |
| 35 | × 1 | 35 | 36 | × 7 | 252 | 287 | 35.875000 |
| 35 | × 1 | 35 | 36 | × 8 | 288 | 323 | 35.888889 |
| 35 | × 1 | 35 | 36 | × 9 | 324 | 359 | 35.900000 |
| 35 | × 0 | 0 | 36 | × 6 | 216 | 216 | 36.000000 |
| 35 | × 0 | 0 | 36 | × 7 | 252 | 252 | 36.000000 |
| 35 | × 0 | 0 | 36 | × 8 | 288 | 288 | 36.000000 |
| 35 | × 0 | 0 | 36 | × 9 | 324 | 324 | 36.000000 |
| 35 | × 0 | 0 | 36 | × 10 | 360 | 360 | 36.000000 |

CONTROL DEVICE FOR HIGH INTENSITY DISCHARGE BULB AND METHOD OF CONTROLLING HIGH INTENSITY DISCHARGE BULB

BACKGROUND OF THE INVENTION

1. Field of the Invention

The present invention relates to a power supply device for a high intensity discharge bulb. In particular, the present invention relates to a power supply device for a discharge tube called a high intensity discharge bulb (hereinafter referred to as a HID bulb) for use in vehicles, such as a headlamp for an automobile or motorcycle.

2. Description of the Related Art

In HID bulbs, there are variations in drive voltage from bulb to bulb. For example, the drive voltage varies from 70 (V) to 100 (V), i.e., the drive voltage is 85±15 (V), which means that the drive voltage varies by about 18%. The emission intensity of a HID bulb is proportional to the electric energy to be applied, i.e., the amount of work (energy). Since HID bulbs have such characteristics, by controlling the currents of individual HID bulbs, the electric energy to be supplied is made constant and variations between products are reduced, whereby uniform intensity is maintained.

In order to control the driving electric energy of a HID bulb, there exists a method in which the pulse width is increased or decreased. This pulse width control method includes an analog type method and a digital type method. In the analog type method, an analog circuit in which pulse width modulation is performed is employed and a dedicated IC is used. In the digital type method, the pulse width is changed by counting the number of pulses and a general-purpose microprocessor is used in many cases.

FIG. 3A is a waveform diagram for explaining the principle of a "pulse counting system." In this example, a duration of 17.5 μS, which is equivalent to 70% of a rectangular wave signal in a repetition period of 25 μS (40 KHz), is an "ON" time and a duration of 7.5 μS, which is the rest of 30%, is an "OFF" time.

The physical definition of electric power is the "power," i.e., the work per unit time, and is represented by the unit of joule/second (J/S). Therefore, $$\text{electric power}(W) = \text{voltage}(V) \times \text{current}(A) \quad (1),$$

and $$\text{electric power}(J/S) = \text{voltage}(J/C) \times \text{current}(C/S) \quad (2),$$

and accordingly, the supply energy (work) to a HID bulb is expressed by the following relational expressions:

$$\text{work}(J) = \text{power}(J/S) \times \text{duration}(S) \quad (3)$$

and $$\text{electric energy}(J) = \text{electric power}(W) \times \text{duration}(S) \quad (4).$$

By applying a voltage of 85 (V) to a 35 (W) HID bulb and passing a current of about 0.412 (A), a predetermined electric power is supplied. Strictly speaking, since the signal is a rectangular wave and alternating-current driving signal, the power factor needs to be taken into consideration; however, in accordance with customary practice, it is represented by an effective value equivalent to a direct current.

| Bulb 35(W) | ON time | 17.5 μS (70%) |
| --- | --- | --- |
| | OFF time | 7.5 μS (30%) |
| | Period | 25.0 μS (100%) (40 KHz) |

In this example, an electric power of 35 (W) is applied during an ON time of 17.5 μS, and thus, the electric energy is as follows:

$$35(W) \times 17.5(\mu S) = 612.5 \times 10^{-6}(J).$$

If the signal is sampled 200 times during a period of 25.0 μS (1 Time Slot (hereinafter referred to as "1 TS")) on a time base, the each sampling time corresponds to 0.125 μS and an ON time of 17.5 μS has 140 samples. Since 35 (W) is 17.5 μS, 35 (W)/140=0.25 (W)/sample, that is, energy to a HID bulb is supplied by an electric power (power) of 0.25 (W) per pulse.

With this sampling pulse using as a unit, by increasing or decreasing an ON TIME of 17.5 μS, the electric energy, i.e., energy, can be controlled. In this example, the electric energy can be controlled in steps of 0.25 (W).

If the number of samples of 25.0 μS during the 1 TS, is reduced from 200 to 50, each sampling time corresponds to 0.5 μS and an ON time of 17.5 μS has 35 samples. 35 (W)/35=1.00 (W)/sample, that is, energy per each pulse is 1 (W), and thus, the step is raised four times the aforementioned case.

As can be seen from the above-described example, in the pulse counting system, the control accuracy may change depending on the number of samples.

To increase the accuracy, the driving frequency of a HID bulb needs to be increased to a sufficiently high frequency.

As a pulse counting means, a general-purpose microprocessor is used. The driving clock is about 30 MHz. By dividing the driving clock, above-mentioned sampling signals are obtained. These days, a small and low-cost component, called a PIC (peripheral interface controller), is supplied to the general-purpose microprocessor. However, the driving clock frequency of a PIC is as low as 10 to 20 MHz, resulting in a drawback such as low accuracy in the conventional pulse counting system.

For a drive device for a high intensity discharge lamp, there are known documents such as the one described in the "Ballasts for HID Head lamp Systems for Automobile" by Tsutomu Shiomi, Takashi Kambara, et al., Matsushita Electric Works Technical Report (May 2001), pp. 13-19.

SUMMARY OF THE INVENTION

As described above, conventional devices have drawbacks in that there are variations in drive voltage from bulb to bulb, and furthermore, the HID bulb itself changes over time with increasing time of use or with the power ON/OFF and thus the drive voltage or current of the HID bulb varies.

In addition, there are problems that the intensity of light emission and hue (tint) stability and uniformity need to be improved.

The present invention is made in view of the aforementioned problems. An object of the present invention is to provide a novel control device for a high intensity discharge bulb in which variations in drive voltage between HID bulbs are absorbed and the accuracy of controlling energy to be supplied is improved, and a method of controlling the high intensity discharge bulb.

To attain the above object, the present invention employs the following technical configuration.

The first aspect of the present invention is a control device for a high intensity discharge bulb, in which by applying drive pulses to the high intensity discharge bulb which is mounted on a vehicle a predetermined target electric power is supplied to the high intensity discharge bulb, the device comprising: drive voltage detecting means for detecting a drive voltage of the high intensity discharge bulb; assumed electric power setting means for setting an assumed drive current for the drive voltage detected by the drive voltage detecting means and setting an assumed supply electric power based on the assumed drive current and the drive voltage detected by the drive voltage detecting means; error calculating means for determining an error between the assumed supply electric power set by the assumed electric power setting means and the target electric power; and correcting means for determining a number of correction pulses that minimizes the error determined by the error calculating means.

The second aspect of the present invention is that the correcting means applies pulses having a first number of pulses per unit time to the high intensity discharge bulb during a first period, and applies pulses having a second number of pulses per unit time to the high intensity discharge bulb during a second period, the second number of pulses being different from the first number of pulses, and the first number of pulses and the second number of pulses are controlled by a pulse control means provided in the control device.

The third aspect of the present invention is that the first number of pulses is different from the second number of pulses by at least one pulse.

The fourth aspect of the present invention is a control device for a high intensity discharge bulb, in which by applying drive pulses to the high intensity discharge bulb which is mounted on a vehicle a predetermined target electric power is supplied to the high intensity discharge bulb, wherein pulses having a first number of pulses per unit time are applied to the high intensity discharge bulb during a first period, pulses having a second number of pulses per unit time are applied to the high intensity discharge bulb during a second period, the second number of pulses being different from the first number of pulses, and the first number of pulses and the second number of pulses are controlled by a pulse control means provided in the control device.

The fifth aspect of the present invention is that a control device for a high intensity discharge bulb, in which by applying drive pulses to the high intensity discharge bulb which is mounted on a vehicle a predetermined target electric power is supplied to the high intensity discharge bulb, the device comprising: first pulse generating means for outputting a first number of pulses per unit time; second pulse generating means for outputting a second number of pulses per unit time which is different from the first number of pulses; and pulse control means for switching between output pulses of the first pulse generating means and output pulses of the second pulse generating means.

The sixth aspect of the present invention is a method of controlling a high intensity discharge bulb, in which by applying drive pulses to the high intensity discharge bulb which is mounted on a vehicle a predetermined target electric power is supplied to the high intensity discharge bulb, the method comprising: detecting a drive voltage of the high intensity discharge bulb; setting an assumed drive current for the drive voltage detected in the detecting step and setting an assumed supply electric power based on the assumed drive current and the drive voltage detected in the detecting step; calculating an error between the assumed supply electric power set in the setting step and the target electric power; and determining a number of correction pulses that minimize the error determined in the calculating step.

The seventh aspect of the present invention is a method of controlling a high intensity discharge bulb according to claim 4, wherein in the determining step, control is performed to change a number of pulses per unit time to be applied to the high intensity discharge bulb.

The eighth aspect of the present invention is a computer program for controlling a high intensity discharge bulb, in which by applying drive pulses to the high intensity discharge bulb which is mounted on a vehicle a predetermined target electric power is supplied to the high intensity discharge bulb, the computer program causing a computer to execute a method comprising the steps of: detecting a drive voltage of the high intensity discharge bulb; setting an assumed drive current for the drive voltage detected in the detecting step and setting an assumed supply electric power based on the assumed drive current and the drive voltage detected in the detecting step; calculating an error between the assumed supply electric power set in the setting step and the target electric power; and determining a number of correction pulses that minimize the error determined in the calculating step.

A HID bulb uses an arc discharge and thus electrode wear increases with increasing time of use, resulting in characteristics that the drive voltage or power consumption changes over time. According to the present invention, successive optimization to such temporal characteristics change (degradation) can be performed and thus a HID bulb achieves stable operation and a longer operating time.

In addition, since, using a microprocessor with a low clock frequency, the supply electric energy can be minutely controlled as is conventionally done, an expensive microprocessor or a dedicated IC is not required, realizing a small, low-cost device, which results in cost effectiveness.

Since control of the present invention can be performed using a program of a microprocessor, design changes can be made easily and development time can be reduced. Furthermore, minute control is possible.

BRIEF DESCRIPTION OF THE DRAWINGS

FIG. 2 is a block diagram showing a configuration of a pulse train generating unit and waveform diagrams of components;

FIG. 8 is a chart showing specific numeric values for a basic process and a correction process by 140 pulse sampling;

FIG. 9 is a chart showing specific numeric values for a correction process by 35 pulse sampling;

FIG. 10 is a chart showing specific numeric values for the basic process and a correction process by 35 pulse sampling using a decimal fraction;

FIGS. 14A to 14E are charts for explaining generation of correction pulses of the present invention; and FIG. 15 is a chart in which the numbers of pulses per 1 TS shown in FIG. 14 are listed in ascending order.

DETAILED DESCRIPTION OF THE PREFERRED EMBODIMENT

In the present invention, an ON (duty) time during which a rectangular wave is applied to a HID bulb is controlled by the number of driving pulses or sampling pulses having a pulse width sufficiently smaller than that of the ON time. In the present invention, two types of rectangular waves having different numbers of driving pulses or sampling pulses are provided. By changing the combination of these two different types of rectangular waves, the driving energy of the HID bulb is increased or decreased, thereby supply electric energy to the HID bulb is controlled.

In the present invention, a two-step method is used. At a first step, an approximate electric power which is close to a target electric power for the HID bulb is set. Then, at a second step, the difference between the approximate electric power and the target electric power is corrected.

An embodiment of the present invention will now be described with reference to the drawings.

Figure 1:
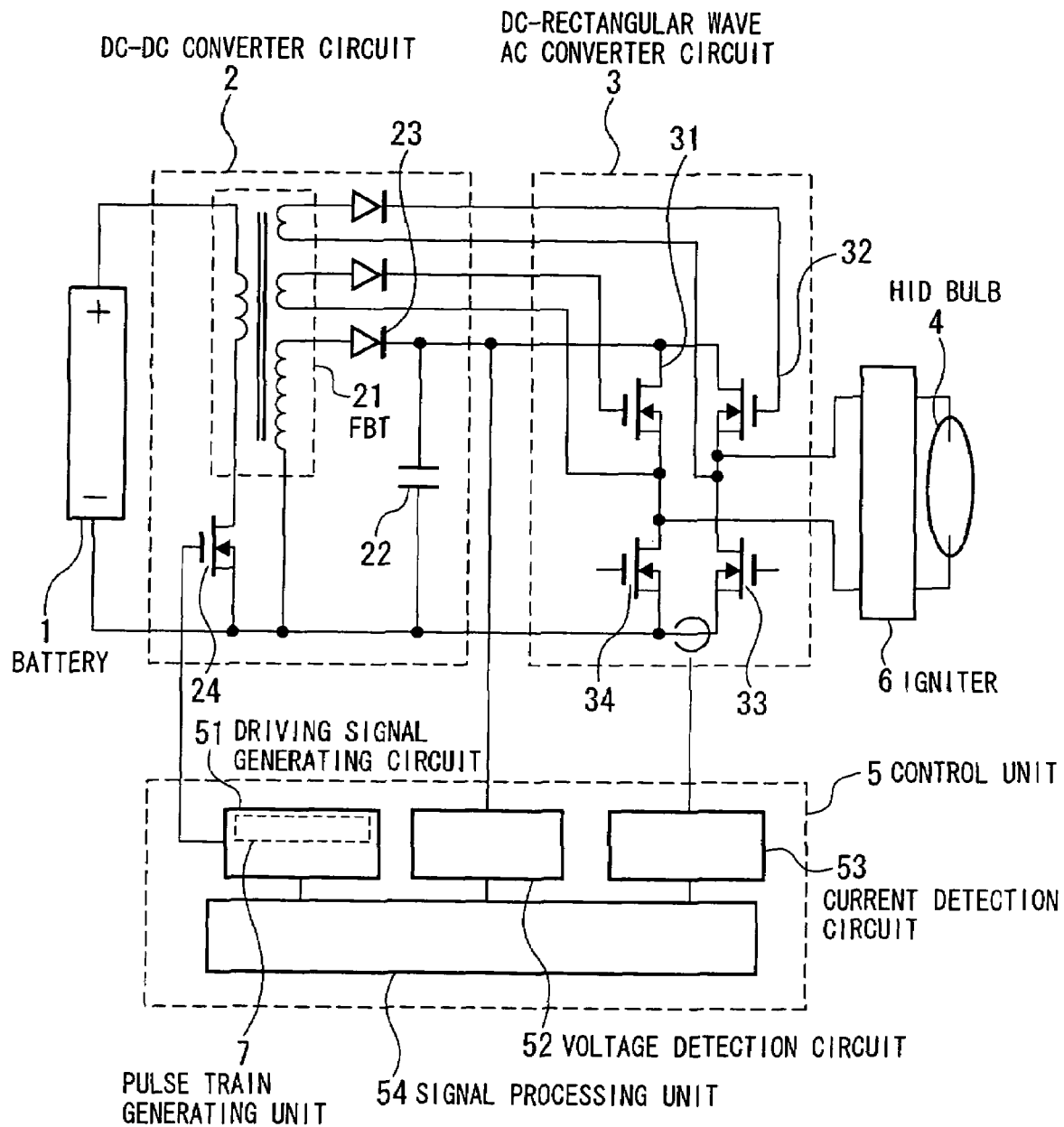
FIG. 1 is a block diagram showing a configuration of a power supply device for a high intensity discharge bulb of the present invention.

FIG. 1 is a circuit diagram showing a configuration of a control device for a high intensity discharge bulb, according to the embodiment of the present invention.

In FIG. 1, a battery 1 is an energy source that supplies electrical energy to a HID bulb 4. The output voltage of a battery to be normally mounted on an automobile is generally 12V DC (24V DC for a large automobile). A DC-DC converter circuit 2 steps up 12V DC to 85V DC and outputs the stepped up voltage. In an alternating-current lighting system, an alternating-current voltage with a repetition frequency in the range of approximately 40 to 60 kHz is applied to the HID lamp 4 during normal operation. Therefore, in order to convert the DC voltage obtained in the DC-DC converter circuit 2 into a rectangular wave AC signal, a DC-rectangular wave AC converter circuit 3 is provided. During normal operation, an output voltage of the DC-rectangular wave AC converter circuit 3 is applied to the HID bulb 4, whereby the operating condition is maintained. An igniter 6 applies high voltage pulses to the HID bulb 4 only at the time of start of operation of the HID bulb 4 so as to allow the HID bulb 4 to operate. Such a configuration is conventionally known.

A control unit 5 includes a driving signal generating circuit 51 including a pulse train generating unit 7 that generates a pulse train of the present invention; a voltage detection circuit 52 that measures an AC voltage to be applied to the HID bulb 4; a current detection circuit 53 that measures the current supplied to the HID bulb 4; and a signal processing unit 54 that performs a control process based on the driving signal generating circuit 51, the voltage detection circuit 52, and the current detection circuit 53.

As a method of controlling increase or decrease of energy, there exists a method in which control is performed by increasing or decreasing an ON time during which a rectangular wave drives a HID bulb. For a method of determining an ON time, sampling is performed with drive pulses having a period sufficiently shorter than that of an ON time and energy is controlled by the number of these drive pulses or sampling pulses.

In the present invention, two different numbers of drive pulses or sampling pulses for determining an ON time are generated in the pulse train generating unit 7. By combining the two different pulse trains and supplying the combination of the pulse trains to the DC-DC converter circuit 2, the accuracy of controlling electric power can be increased. The details of the configuration and operation of the pulse train generating unit 7 will be described later.

Now, these processes will be described.

Figure 4:
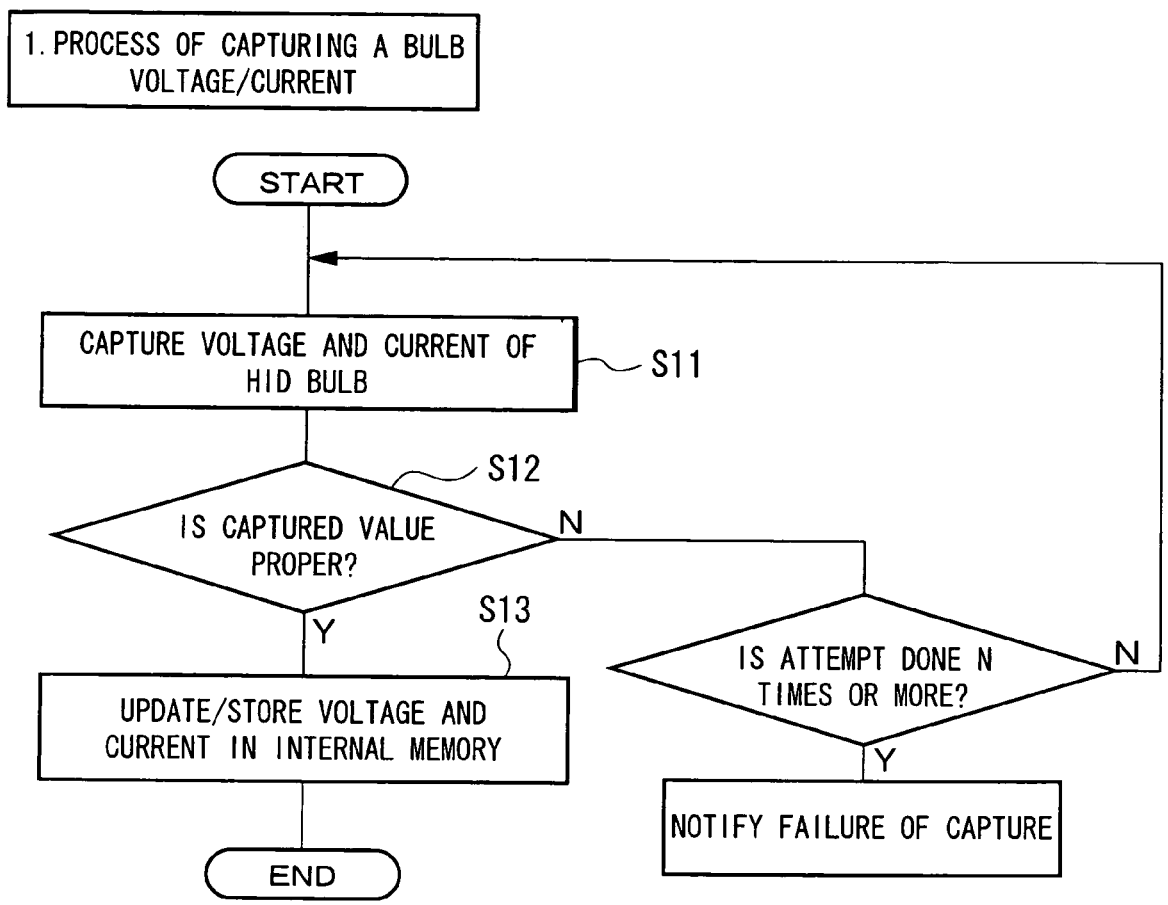
FIG. 4 is a flowchart for explaining a process of capturing a bulb voltage/current.

(1) Process of Capturing a Bulb Voltage/Current (FIG. 4)

FIG. 4 is a flowchart showing processing steps of capturing a bulb voltage/current. The processing steps are as follows. The drive voltage and current of a HID bulb are read (step S11). If the read data is normal (step S12), the read data is captured in a memory of a microprocessor provided in the signal processing unit 54 (step S13). Normally, such information is updated at certain time intervals or at necessary points and stored in the memory. The reading is performed using the voltage detection circuit 52 and the current detection circuit 53 of FIG. 1. Since the read voltage and current have analog values, the values are converted into digital values using an AD converter circuit and processed in the microprocessor.

Figure 5:
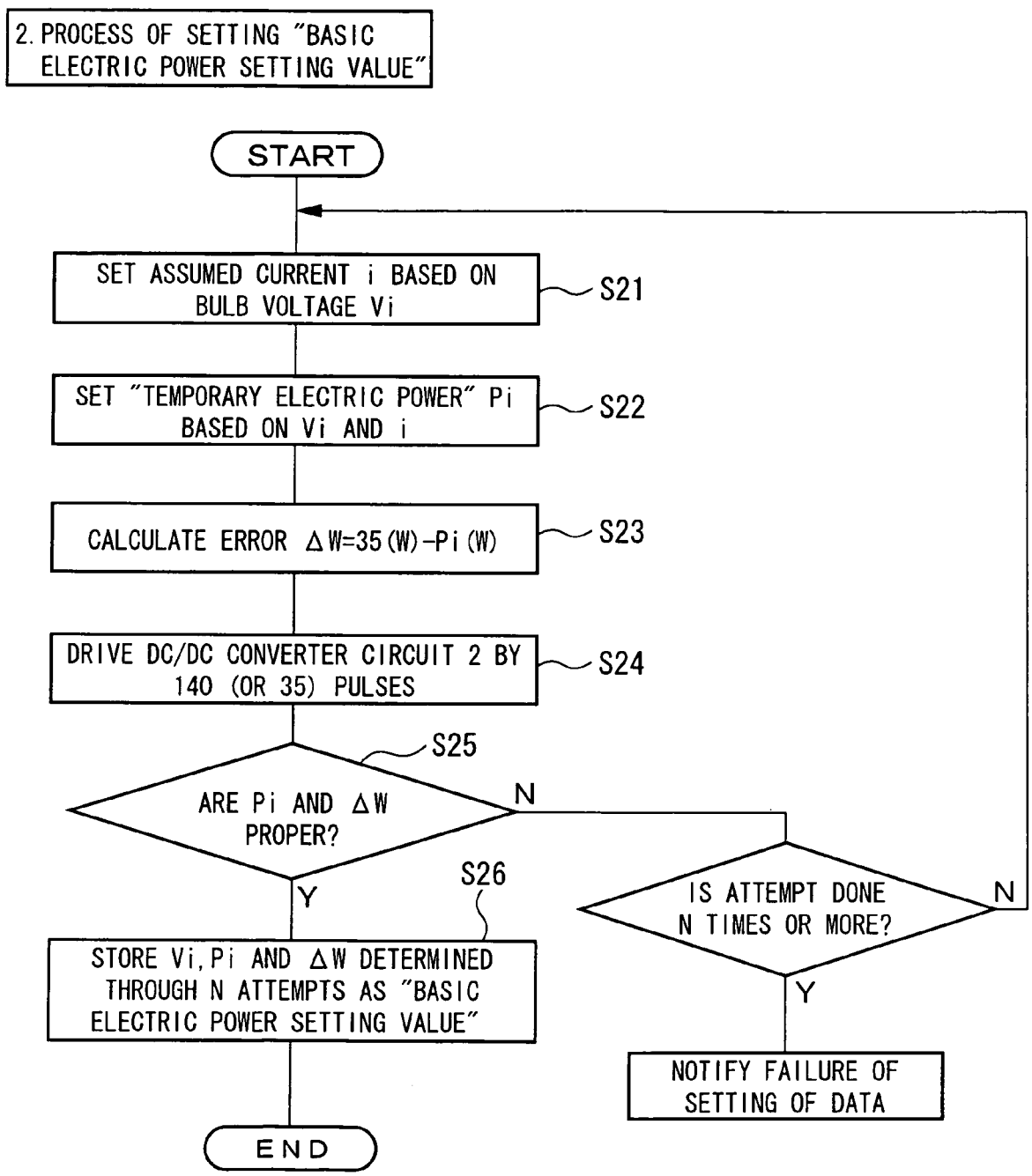
FIG. 5 is a flowchart for explaining a process of setting a basic electric power.

(2) Process of Setting a "Basic Electric Power Setting Value" (FIG. 5)

FIG. 5 is a flowchart showing processing steps of setting an approximate electric power which is close to a target electric power for a HID bulb.

FIGS. 8 and 9 are exemplary charts showing quantitative data for explaining the operation of FIG. 5.

In FIG. 5, first, a predetermined drive current is set based on a bulb voltage Vi captured in the memory in the process of FIG. 4 (step S21). In the chart of FIG. 8, the bulb voltage Vi corresponds to any one of the values of the "bulb voltage" shown in column C. The voltage value of a HID bulb varies from bulb to bulb. The variation width of the voltage value is on the order of 85±15 (V). Then, an "assumed current" is set for the read "bulb voltage." In FIG. 8, the assumed current is shown in column E. Note that if the voltage is within a certain range, a predetermined current value is uniquely assigned.

In the chart of FIG. 8, in a voltage range of 73.50 to 76.50 (V) shown from lines 5 to 11 of column C, i.e., 75±1.5 (V), an assumed current of 0.466667 (A) shown from lines 5 to 11 of column E is set. In a voltage range of 83.50 to 86.50 (V) shown from lines 12 to 18 of column C, i.e., 85±1.5 (V), an assumed current of 0.411765 (A) shown from lines 12 to 18 of column E is set. In a voltage range of 93.50 to 96.50 (V) shown from lines 19 to 25 of column C, i.e., 95±1.5 (V), an assumed current of 0.368421 (A) shown from lines 19 to 25 of column E is set.

At step S22, a temporary electric power (an assumed supply electric power) Pi is set based on the HID drive voltage Vi and assumed current i set at step S21. Column F of the chart of FIG. 8 shows the temporary electric power (assumed supply electric power) Pi.

At step S23, an error is calculated. The drive current to the HID bulb has an assumed current value that requires slight adjustment. Thus, the temporary electric power Pi includes a plus/minus error including zero, with respect to the target electric power. Column G of the chart of FIG. 8 shows this error. In an example of FIG. 8, the target value is 35 (W) and the value of error $\Delta W$ (=35 (W)–Pi(W)) is shown in column G. Note that column G of FIG. 8 shows the absolute value of the error in |(W)|. The error rate $\Delta\%$ with respect to 35 (W) is shown in column H.

At step S24, the DC-DC converter circuit 2 is controlled to supply a predetermined electric power to the HID bulb 4 under conditions set at steps S21 to S23. The driving signal generating circuit 51 changes the number of pulses provided from a calculation result of the signal processing unit 54 to a pulse width which is an analog quantity, and drives switching elements 31 to 34 of the DC-rectangular wave AC converter circuit 3.

At step S25, an operation of determining, as a result of driving the DC-DC converter circuit 2, whether the temporary electric power value is proper is performed. At first, the value is held in a memory; in the case of repetition the current value is compared with a previous value; a determination as to whether the value is proper is made; and steps S21 to S24 are attempted several times (N times). Here, for easy explanation of the operation of the present invention, steps S21 to S24 are attempted several times (N times) according to whether the setting electric power Pi and the error $\Delta W$ are proper; however, in practice, conditions, such as battery voltage fluctuations, the temperature of the HID bulb, the presence or absence of a load, abnormality in the HID bulb, and a short-circuit of an output, are determined and whether or not obtained data is normal is determined. At step S26, the values of the bulb voltage Vi, temporary electric power Pi, and error $\Delta W$ which are found to be within the allowable range as a result of attempting steps S21 to S25, are ultimately set as a basic electric power and stored in the memory of the microprocessor as a "basic electric power setting value".

Figure 6:
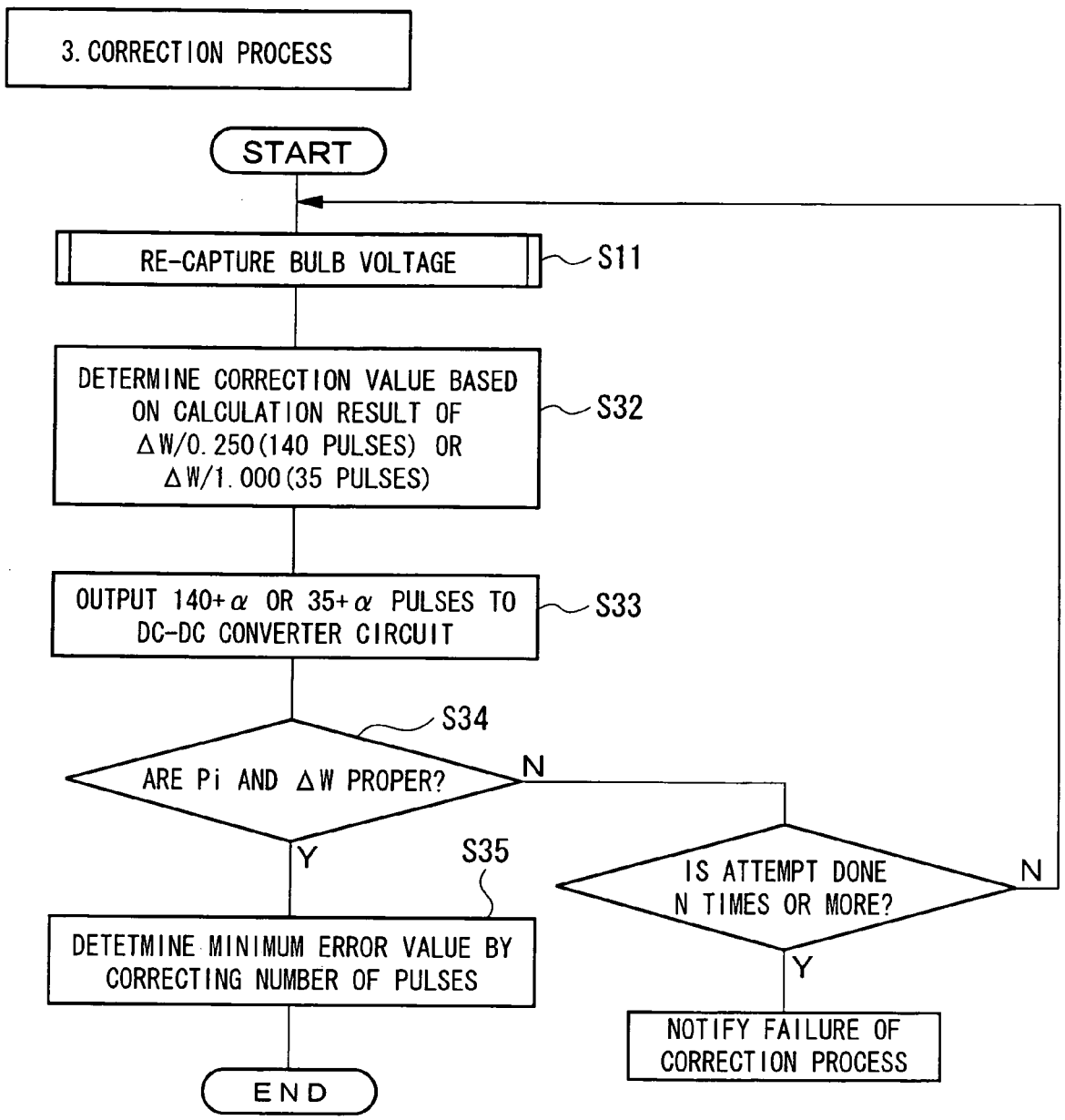
FIG. 6 is a flowchart for explaining a correction process using an integer.

(3) Correction Process Using 140 Sampling Pulses During an ON TIME (FIG. 6)

FIG. 6 is a flowchart showing an operation of making a correction so as to increase the accuracy of the "basic electric power setting value" set in FIG. 5. Columns I to O of the chart of FIG. 8 show values associated with the process of FIG. 6.

At step S32 of FIG. 6, an operation of calculating the number of pulses for correction based on a detected bulb voltage is performed. It is preferred that an error electric power $\Delta W$ obtained in the process of setting the "basic electric power setting value" of FIG. 5 is ideally zero. At the time of setting a "basic electric power setting value", 140 pulses are input to the DC-DC converter circuit 2 during 1 TS and as described above, it can be considered that the electric power is 0.250 (W) per pulse with respect to a target electric power of 35 (W), and thus, by dividing the error electric power $\Delta W$ by 0.250 (W) per pulse, the number of pulses necessary for error correction can be obtained. In the chart of FIG. 8, column I shows values of the calculated number of pulses.

In an example of the chart of FIG. 8, the numbers of error pulses shown on lines 5 to 11 of column I are 2.800000, 1.866667, 0.933333, 0.000000, −0.933333, −1.866667, and −2.800000. The numbers of correction pulses ($\alpha$) that minimize these errors are as follows:

| ($\Delta W/0.250$) | | ($\alpha$) |
|---|---|---|
| 2.800000 | → | 3 |
| 1.866667 | → | 2 |
| 0.933333 | → | 1 |
| 0.000000 | → | 0 |
| −0.933333 | → | −1 |
| −1.866667 | → | −2 |
| −2.800000 | → | −3 |

Then, at step S32, using the obtained $\alpha$ a calculation of (140+$\alpha$) is performed, whereby the number of correction pulses is determined. In the chart of FIG. 8, the correction value $\alpha$ is shown in column J. By adding the correction value $\alpha$ for correction and a value of 140 pulses determined at the time of setting a basic electric power setting value which is shown in column K, the number of correction pulses in column L is obtained. Electric power W after electric power is optimized by the number of correction pulses, residual error electric power $\Delta W$, and error rate $\Delta\%$ after correction with respect to 35 (W) are shown in columns M, N, and O of FIG. 8, respectively.

At steps S33 to S35, the number of correction pulses is output to the DC-DC converter circuit 2 in order to check the operations of steps S31 and S32. If there is nothing wrong, the number of correction pulses is stored in the memory of the microprocessor as a minimum error value.

The above describes the case of driving a HID bulb by 140 pulse sampling.

Figure 3:
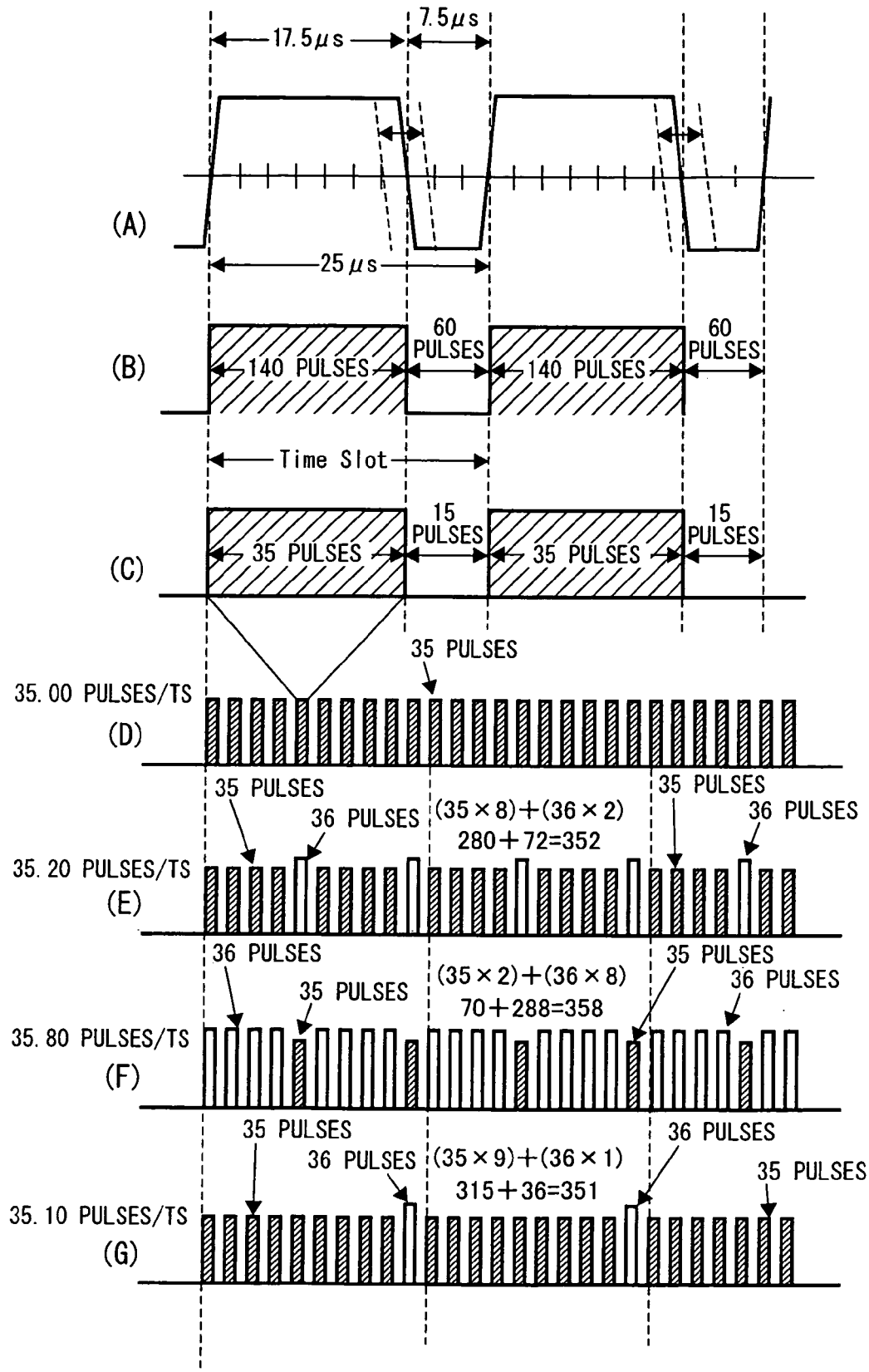
FIGS. 3A to 3G are waveform diagrams for explaining operation of the present invention.

Now, the case of driving a HID bulb by 35 pulse sampling will be described. The operation of 35 pulse sampling has exactly the same functionality as the above-described 140 pulse sampling. The only difference between the two operations is that as shown in FIGS. 3B and 3C the number of pulses per 1 TS is different.

FIG. 9 is a chart showing data for 35 pulse sampling. In this chart, the setting of the basic electric power is exactly the same as that of 140 pulse sampling; therefore, data shown in a region of lines 1 to 27 of columns B to H of FIG. 9 is exactly the same as that of FIG. 8.

The data shown in columns I to O in FIG. 8 are different from those in FIG. 9. The differences are summarized as follows:

1. The number of sampling pulses: 140→35
2. Electric power per pulse: 0.250 (w)→1.000 (W)
3. Correction accuracy becomes rough, if the correction is performed as shown in FIG. 6.

Figure 11:
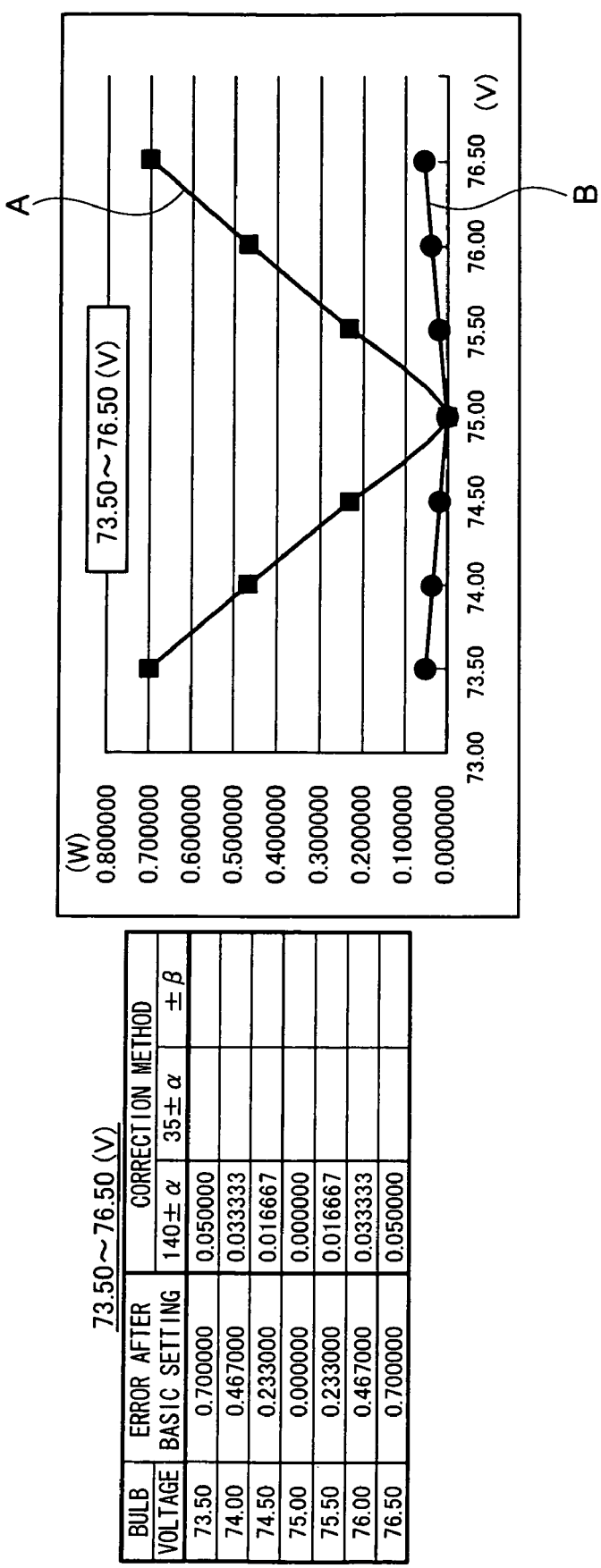
FIG. 11 is a diagram showing an error state after a correction process is performed in 140 pulse sampling.
Figure 12:
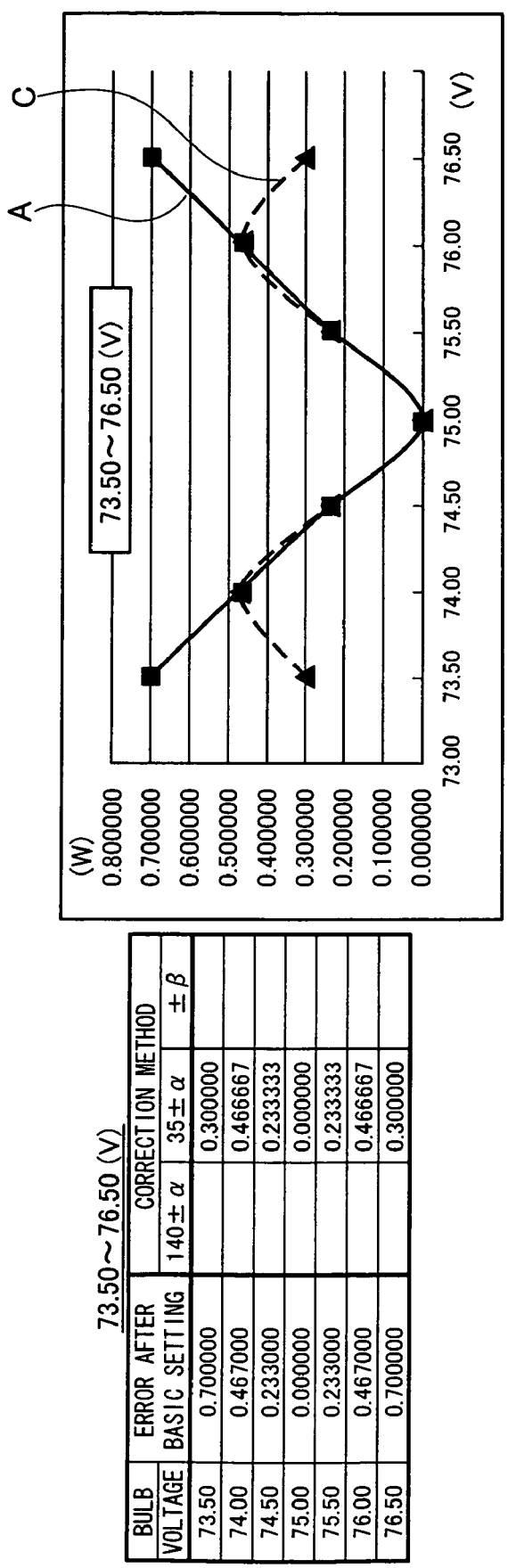
FIG. 12 is a diagram showing an error state after a correction process is performed in 35 pulse sampling.

As shown in FIG. 11, in the case of 140 pulses, the error is corrected significantly only by a correction process shown in FIG. 6. In FIG. 11, the curve A indicates errors after the process shown in FIG. 5 is performed (refer to column G in FIG. 8), the curve B indicates errors after the process shown in FIG. 6 with 140 sampling pulses is performed (refer to column N in 8). On the other hand, in the case of 35 pulses, as shown in FIG. 12, there is a problem that a minute correction cannot be made. In FIG. 12, the curve A indicates errors after the process shown in FIG. 5 is performed (refer to column G in FIG. 8), the curve C indicates errors after the process shown in FIG. 6 with 35 sampling pulses is performed (refer to column N in 9).

Figure 7:
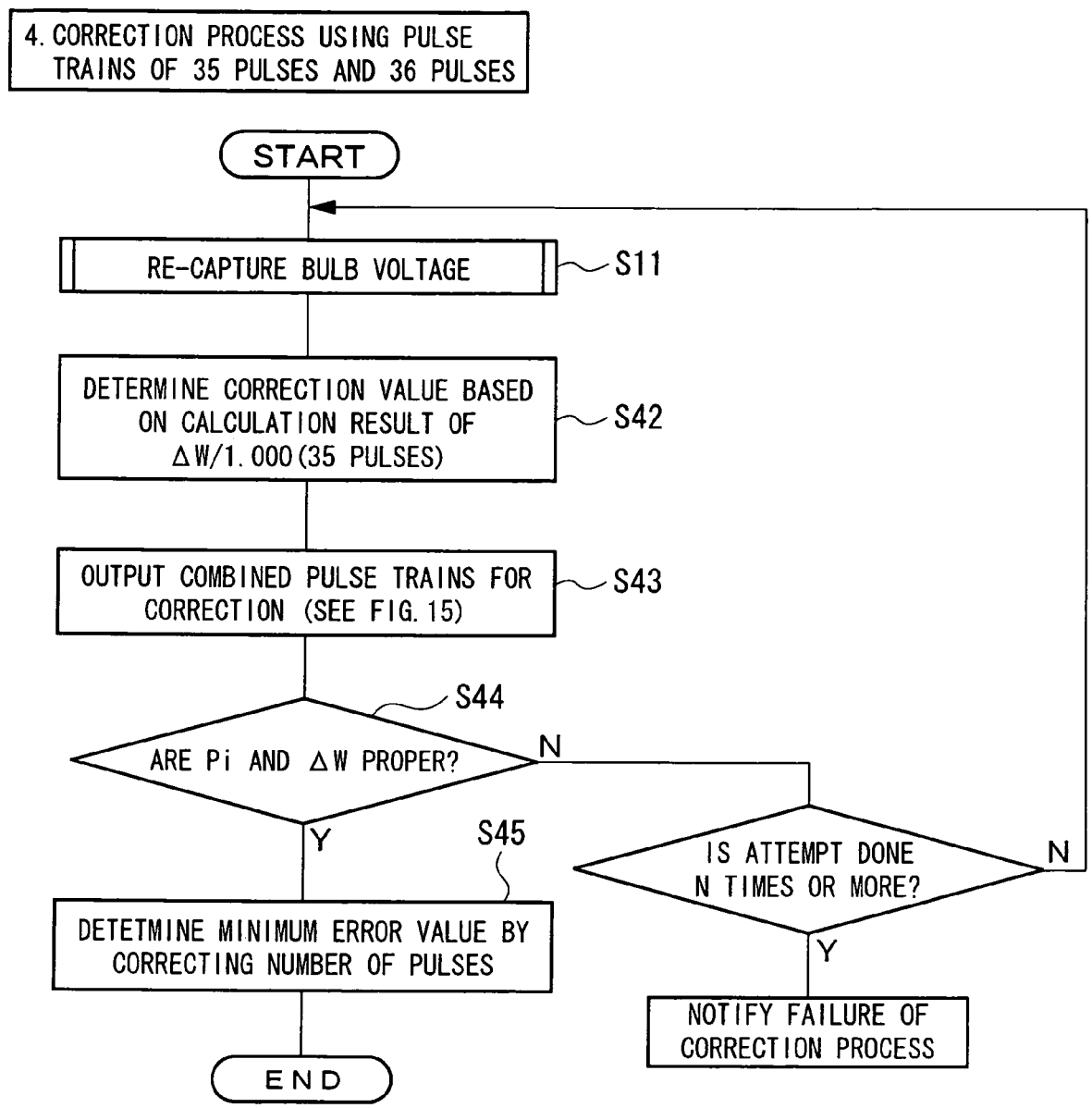
FIG. 7 is a flowchart for explaining a correction process using a decimal fraction.

In the present invention, in order to solve the above-described problem using a microprocessor with a low clock frequency, a correction process of FIG. 7 is performed, whereby a highly accurate correction can be made even when the number of sampling pulses is small such as 35 pulse sampling.

(4) Correction Process Using Pulse Trains of 35 Pulses and 36 Pulses (FIG. 7)

FIG. 7 is a flowchart for explaining a correction process of the present invention. FIG. 10 is a chart showing specific data for explaining the correction process of FIG. 7.

In FIG. 10, a region encompassing lines 1 to 27 of columns A to O includes data which is exactly the same as that in FIG. 9 and which shows a correction by 35 pulse sampling. In FIG. 10, a region encompassing lines 1 to 27 of columns P to S includes data showing correction results obtained by the process of FIG. 7.

First, for a bulb voltage captured at step S11, the number of pulses required for a residual error after correction is determined (step S42). This calculation is done as follows:

The number of correction pulses=(residual error)/
(electric power per pulse(1.0($W$))

A specific explanation is provided using FIG. 10. In the case of line 5 of FIG. 10, the setting value in column F is 34.300000 and an error of 0.700000 shown in column G is a shortage. The number of correction pulses for this error is 0.700000 pulses shown in column P and the number of pulses ultimately required is 35.700000.

In the case of line 6 of FIG. 10, the setting value in column F is 34.533333 and an error of 0.466667 shown in column G is a shortage. The number of correction pulses for this error is 0.444444 pulses shown in column P for the case of the device of the present invention, and the number of pulses ultimately required is 35.444444.

If the above-described 35.700000 or 35.444444 is obtained, a predetermined electric power can be supplied to a discharge bulb.

Now, a method of generating correction pulses shown in column P in FIG. 10 will be described.

FIGS. 3D to 3G are diagrams showing a method of generating a correction pulses. FIG. 3D is a diagram showing an example in which pulses are continuously input to the DC-DC converter circuit 2 at a rate of 35 pulses per TS.

In FIG. 3E, pulses are sent to the DC-DC converter circuit 2 at a rate of 35 pulses per TS, which is repeated eight times, and at a rate of 36 pulses per TS, which is repeated twice. In the case of continuing this repetition, 35×8 (times)=280 pulses and 36×2 (times)=72 pulses. Thus the total number of output pulses is 352 pulses; therefore, it can be considered that 352/10 (times)=35.20 pulses per TS on average are input to the DC-DC converter circuit 2.

Similarly, in the case of FIG. 3F, the average number of pulses per TS is 358/10 (times)=35.80 pulses. In the case of FIG. 3G, the average number of pulses per TS is 35.10 pulses.

FIG. 14 shows diagrams showing combinations of two types of pulse trains, 35 pulses and 36 pulses, which are used to generate pulse trains from 35.000000 pulses to 36.000000 pulses. Taking an example of FIG. 14E, outputting 35 pulses 10 times results in 350 pulses in total. While, if a pulse train including a pulse train of 35 pulses nine times and a pulse train of 36 pulses once is output ten times, the total number of pulses results in 351 pulses. In this case, one extra sampling pulse is generated during 1 TS, and it can be considered that 35.1 pulses (=351/10 (times)) during 1 TS is output to DC-DC converter circuit 2.

In FIG. 14E, pulse trains equivalent to 35.000000 drive pulses, 35.100000 pulses, 35.200000 pulses, 35.300000 pulses, 35.400000 pulses, 35.500000 pulses, 35.600000 pulses, 35.700000 pulses, 35.800000 pulses, 35.900000 pulses, 36.000000 pulses are obtained.

Similarly, In FIG. 14A, pulse trains equivalent to 35.000000 pulses, 35.166667 pulses, 35.333333 pulses, 35.500000 pulses, 35.666667 pulses, 35.833333 pulses, 36.000000 pulses are obtained.

Similarly, In FIG. 14B, pulse trains equivalent to 35.000000 pulses, 35.142857 pulses, 35.285714 pulses, 35.428571 pulses, 35.571429 pulses, 35.714286 pulses, 35.857143 pulses, 36.000000 pulses are obtained.

In FIG. 14C, pulse trains equivalent to 35.000000 pulses, 35.125000 pulses, 35.250000 pulses, 35.375000 pulses, 35.500000 pulses, 35.625000 pulses, 35.750000 pulses, 35.875000 pulses, 36.000000 pulses are obtained.

In FIG. 14D, pulse trains equivalent to 35.111111 pulses, 35.222222 pulses, 35.333333 pulses, 35.444444 pulses, 35.555555 pulses, 35.666666 pulses, 35.777777 pulses, 35.888888 pulses, 35.999999 pulses, 36.000000 pulses are obtained.

FIGS. 14A to 14E show one example of generating pulse trains, such generation method can be realized using combinations other than those described in the table. In addition, although the combination of two types, 35 pulses and 36 pulses, is used as an example, the combination of three types, four types, or the like may be used.

FIG. 15 is a table in which the numbers of pulses per TS shown in the table of FIGS. 14A to 14E are listed in ascending order. The table of FIG. 15 is stored in advance in the memory of the control unit 5.

In FIG. 7, at step S43, the signal processing unit 54 controls the pulse train generating unit 7 to output the number of pulses using a combination of a 35 pulse train and a 36 pulse train having the least error according to the above-described table. Then, it is checked whether there is any problem with this condition. If there is no problem, a correction result of step S42 is determined (steps S44 and S45).

Figure 13:
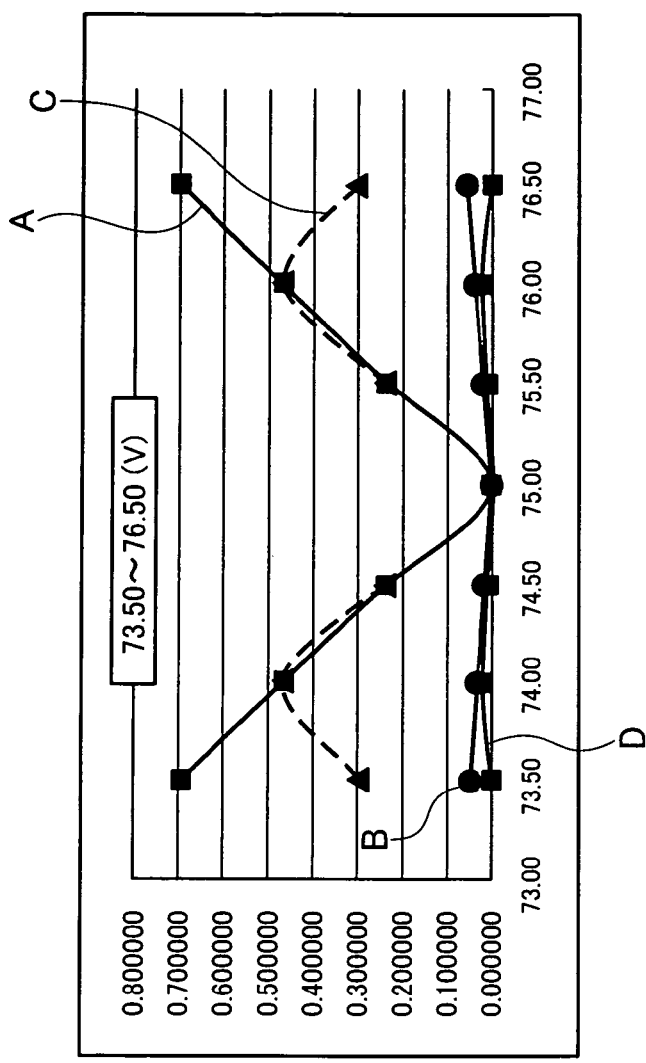
FIG. 13 is a diagram showing the state of the basic setting by 140 pulse sampling, the state after the correction process using an integer is done, the state after the correction process by 35 pulse sampling using an integer is done, and a state after a correction process by 35 pulse sampling using a decimal fraction is done.

In FIG. 13, the curve A indicates errors after the process shown in FIG. 5 is performed, the curve C indicates errors after the process shown in FIG. 6 with 35 sampling pulses is performed, the curve B indicates errors after the process shown in FIG. 6 with 140 sampling pulses is performed and the curve D indicates errors after the process shown in FIG. 7 with 35 sampling pulses is performed.

Based on the charts of FIGS. 8 to 10, a comparison between the average value of errors $\Delta W$ and a standard deviation of errors $\Delta W$ is made as follows:

|  | Average Value of $\Delta W$ | Standard deviation of $\Delta W$ |
|---|---|---|
| Basic process (FIG. 8) | 0.356244 | 0.217818 |
| 140 ± α (FIG. 8) | 0.055890 | 0.038773 |
| 35 ± α (FIG. 9) | 0.285714 | 0.148970 |
| Process in FIG. 7 (FIG. 10) | 0.006862 | 0.006322 |

As such, even by 35 pulse sampling, an error can be made sufficiently small.

FIG. 2 is a diagram showing a configuration of the pulse train generating unit 7 and waveform output from each component thereof. Reference numeral 71 denotes an oscillation circuit which, in the present embodiment, generates a pulse signal of 2 MHz. A 35 pulse generating circuit 72 and a 36 pulse generating circuit 73 respectively generate 35 and 36 pulses of 2 MHz during a single Time Slot. From the oscillation circuit 71 is output a pulse signal 81. From the 35 pulse generating circuit 72 is output a pulse train 82. From the 36 pulse generating circuit 73 is output a pulse train 83. A Time Slot generating circuit 74 outputs a trigger signal 84 every 200th or 50th time the Time Slot generating circuit 74 counts a pulse signal 81 of 2 MHz. A pulse control circuit 75 generates a switching signal 85 in synchronization with the trigger signal 84 from the Time Slot generating circuit 74, and also controls switching of a switching circuit 76 based on a combination of two pulse trains stored in the memory at step S45 to apply a corrected pulse train 86 to the HID lamp.

In FIG. 2, a description is made that the 35 pulse generating circuit 72 and the 36 pulse generating circuit 73 are separately provided.

However, in practice, they are implemented by software. Specifically, data for generating 35 pulses is set in a register and a pulse train of 35 pulses is output. Data for generating 36 pulses is set in the register and a pulse train of 36 pulses is output. By controlling the setting of data in the register by a pulse control unit 75, a pulse train of 35 pulses and a pulse train of 36 pulses are output.

In the case of 35 pulse sampling, it is not necessary to perform a correction process by 35 pulse sampling shown in columns I to O of FIGS. 9 and 10. After a basic process shown in FIG. 5, a correction process shown in columns P to S in FIG. 10 is performed.

In the above description, although control is performed by program processing of a microprocessor, hardware equivalent to this may be used.

In addition, although an actual device requires functionality such as stable operation and avoidance of an abnormal condition, the present embodiment does not describe such functionality for the sake of brevity.

What is claimed is:

1. A control device for a high intensity discharge bulb, in which by applying drive pulses to said high intensity discharge bulb which is mounted on a vehicle a predetermined target electric power is supplied to said high intensity discharge bulb, said device comprising:
   first pulse generating means for outputting a first number of pulses per unit time to said high intensity discharge bulb during a first period;
   second pulse generating means for outputting a second number of pulses per unit time to said high intensity discharge bulb during a second period, said second number of pulses being different from said first number of pulses;
   drive voltage detecting means for detecting a drive voltage of said high intensity discharge bulb;
   assumed electric power setting means for setting an assumed drive current for said drive voltage detected by said drive voltage detecting means and setting an assumed supply electric power based on said assumed drive current and said drive voltage detected by said drive voltage detecting means;
   error calculating means for determining an error between said assumed supply electric power set by said assumed electric power setting means and said target electric power; and
   correcting means for determining a number of pulses output from said first pulse generating means and a number of pulses output from second pulse generating means so as to minimize said error determined by said error calculating means.

2. The control device for a high intensity discharge bulb according to claim 1, wherein
a pulse control means provided in said control device controls outputting of said first number of pulses from said first pulse generating means and said second number of pulses from said second pulse generating means.

3. The control device for a high intensity discharge bulb according to claim 1, wherein said first number of pulses is different from said second number of pulses by at least one pulse.

4. A method of controlling a high intensity discharge bulb, in which by applying drive pulses to said high intensity discharge bulb which is mounted on a vehicle a predetermined target electric power is supplied to said high intensity discharge bulb, a control means of said high intensity discharge bulb comprising first pulse generating means for outputting a first number of pulses per unit time to said high intensity discharge bulb during a first period and second pulse generating means for outputting a second number of pulses per unit time to said high intensity discharge bulb during a second period, said second number of pulses being different from said first number of pulses, said method comprising the steps of:
   detecting a drive voltage of said high intensity discharge bulb;
   setting an assumed drive current for said drive voltage detected in the detecting step and setting an assumed supply electric power based on said assumed drive current and said drive voltage detected in the detecting step;
   calculating an error between said assumed supply electric power set in the setting step and said target electric power; and
   determining a number of pulses output from said first pulse generating means and a number of pulses output from second pulse generating means so as to minimize said error determined in the calculating step.

5. A computer program for controlling a high intensity discharge bulb, in which by applying drive pulses to said high intensity discharge bulb which is mounted on a vehicle a predetermined target electric power is supplied to said high intensity discharge bulb, said computer program causing a computer to execute a method comprising the steps of:
   detecting a drive voltage of said high intensity discharge bulb;
   setting an assumed drive current for said drive voltage detected in the detecting step and setting an assumed supply electric power based on said assumed drive current and said drive voltage detected in the detecting step;
   calculating an error between said assumed supply electric power set in the setting step and said target electric power;
   determining a number of pulses applied to said high intensity discharge bulb during a first period and a number of pulses applied to said high intensity discharge bulb during a second period so as to minimize said error determined in the calculating step; and
   outputting a first number of drive pulses per unit time to said high intensity discharge bulb during said first period and outputting a second number of drive pulses per unit time to said high intensity discharge bulb during said second period, said second number of pulses being different from said first number of pulses.

* * * * *